A. F. MADDEN.
SEPARATOR FOR SECONDARY STORAGE BATTERIES.
APPLICATION FILED MAR. 7, 1908.
985,045.                                Patented Feb. 21, 1911.
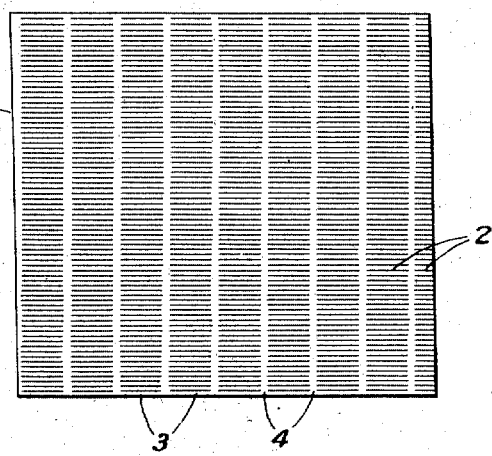
FIG. 1.
      
FIG. 2.       FIG. 3.       FIG. 4.
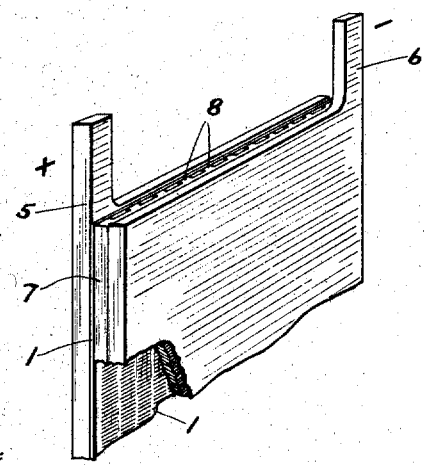
FIG. 5.
WITNESSES:
INVENTOR
Albert F. Madden
BY
Augustus B. Stoughton
ATTORNEY.

UNITED STATES PATENT OFFICE.

ALBERT F. MADDEN, OF NEWARK, NEW JERSEY, ASSIGNOR TO THE ELECTRIC STORAGE BATTERY COMPANY, OF PHILADELPHIA, PENNSYLVANIA, A CORPORATION OF NEW JERSEY.

SEPARATOR FOR SECONDARY STORAGE BATTERIES.

985,045.  Specification of Letters Patent. Patented Feb. 21, 1911.

Application filed March 7, 1908. Serial No. 419,823.

*To all whom it may concern:*

Be it known that I, ALBERT F. MADDEN, a citizen of the United States, residing at Newark, in the county of Essex and State of New Jersey, have invented a certain new and Improved Separator for Secondary Storage Batteries, of which the following is a specification.

The object of the present invention is to provide a separator which will permit of the necessary or requisite passage of the electrolyte and will at the same time be practically impervious to the passage of material which may become detached or washed free from the face of the plate, and which is exceedingly finely divided.

The separator is characterized by being detached or complete in itself and by a vast number of minute slits, meaning thereby openings formed in it without the removal of any of its material and it will be more fully described and finally claimed.

In the accompanying drawings, Figure 1, is a front view of a separator embodying features of the invention but drawn to an enlarged scale. Figs. 2, 3, and 4, are cross-sectional views illustrating diagrammatically the separator shown in Fig. 1, and two modifications thereof, and Fig. 5 is a perspective view showing a separator embodying features of the invention in application to a pair of plates.

In the drawings 1, is the separator and it is provided with a vast number of slits 2. The separator consists of material usually employed for that purpose and of which hard rubber is a good illustration. The slits are shown as arranged in rows 3, with solid bars 4, between them. The slits are made without removing material from the sheet which constitutes the separator. The sheet is exceedingly thin and may be compared with a sheet of ordinary paper and the slits are the same as cuts which would be made with a knife; that is to say, no material is removed in their making. Between the slits, the material of the separator may be inclined in the same direction as shown in Fig. 2, or in different directions as shown in Fig. 4, or the material between the slits may be staggered as shown in Fig. 3. Of course the separator having the described character of slits therein may be used in a variety of ways, but for the sake of description one way is shown in Fig. 5. In that figure, 5, is a positive pole plate and 6, a negative pole plate. 7, is a separator as of wood, flat or plain on the face next the negative pole plate and vertically grooved on the opposite face between which and the positive pole plate, is interposed the separator 1. The blank spaces 4, of the separator may be arranged opposite the faces or ribs 8 on the parts 7. When this is done the blank spaces 4, serve to keep the wood out of contact with the positive pole plate, which is desirable, because the chemical action at the positive pole plate is such that the wood, if in contact with it would be injured or rotted. Since the slits are of the character described, that is, formed without the removal of any of the material of the separator, it follows that they are admirably adapted to retain the fine loose material, while at the same time permitting the passage of the electrolyte, and if the material between the slits be inclined or arranged in the manner shown in Figs. 3, and 4, the slits are made somewhat more open for the passage of the electrolyte but still operate to permanently retain any loose material.

What I claim is:

1. A separator for secondary or storage batteries consisting of an independent sheet having a multiplicity of parallel closely spaced slits cut through it with the portions of the sheets between the successive slits offset, substantially as described.

2. A separator for secondary or storage batteries consisting of a sheet having a multiplicity of slits cut through it with the material between the slits inclined, substantially as described.

In testimony whereof I have hereunto signed my name.

ALBERT F. MADDEN.

Witnesses:
 ALBERT TAYRIN,
 BRUCE FORD.